United States Patent
McIntosh et al.

(10) Patent No.: US 8,392,725 B2
(45) Date of Patent: *Mar. 5, 2013

(54) METHOD FOR FAST DECRYPTION OF PROCESSOR INSTRUCTIONS

(75) Inventors: Gordon D. McIntosh, Austin, TX (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,227

(22) Filed: Nov. 21, 2011

(65) Prior Publication Data

US 2012/0066516 A1  Mar. 15, 2012

Related U.S. Application Data

(63) Continuation of application No. 11/114,552, filed on Apr. 26, 2005, now Pat. No. 8,086,871.

(51) Int. Cl.
*G06F 11/30* (2006.01)

(52) U.S. Cl. ........ 713/190; 713/189; 711/163; 711/164; 726/1; 726/2; 726/22; 726/26; 726/34; 712/208; 712/209

(58) Field of Classification Search .................. 713/189, 713/190; 711/163, 164; 726/1, 2, 22, 26, 726/34; 712/208, 209
See application file for complete search history.

(56) References Cited

U.S. PATENT DOCUMENTS

| | | | |
|---|---|---|---|
| 6,735,310 B1 | 5/2004 | Hsing et al. | |
| 6,798,884 B1 | 9/2004 | Kasahara et al. | |
| 2002/0051536 A1* | 5/2002 | Shirakawa et al. | 380/45 |
| 2002/0101995 A1 | 8/2002 | Hashimoto et al. | |
| 2002/0129244 A1* | 9/2002 | DaCosta | 713/165 |
| 2002/0194389 A1* | 12/2002 | Worley et al. | 709/310 |
| 2003/0046563 A1 | 3/2003 | Ma et al. | |
| 2004/0117639 A1 | 6/2004 | Mowery | |
| 2004/0240484 A1* | 12/2004 | Argyres et al. | 370/535 |
| 2004/0255199 A1 | 12/2004 | Yamashita | |
| 2005/0188171 A1* | 8/2005 | McIntosh | 711/200 |
| 2006/0015748 A1* | 1/2006 | Goto et al. | 713/190 |

FOREIGN PATENT DOCUMENTS

| | | |
|---|---|---|
| JP | 2001034474 A | 2/2001 |
| JP | 2005018434 A | 1/2005 |
| TW | 378473 | 1/2000 |
| TW | 546936 | 8/2003 |
| TW | 567702 | 12/2003 |
| TW | 595183 | 6/2004 |

OTHER PUBLICATIONS

Japan Office Action partial translation Jul. 5, 2011.
File History of U.S. Appl. No. 11/114,552.
U.S. Appl. No. 11/114,552, filed Apr. 26, 2005, McIntosh, et al.

* cited by examiner

*Primary Examiner* — Edan Orgad
*Assistant Examiner* — Roderick Tolentino
(74) *Attorney, Agent, or Firm* — Mitch Harris, Atty at Law, LLC; Andrew M. Harris; Matthew W. Baca

(57) ABSTRACT

A processor, circuit and method provide for fast decryption of encrypted program instructions for execution by the processor. A programmable look-up coding is used to decode a field within the instructions. The decoded field for the instructions are recombined with the remaining portion of the same instructions to yield the decoded instructions. The programmable look-up coding can be programmed and controlled by a process executing at a higher privilege level than the program represented by the instructions, so that security against code-modifying attacks is enhanced.

21 Claims, 4 Drawing Sheets

METHOD FOR FAST DECRYPTION OF PROCESSOR INSTRUCTIONS

This Application is a Continuation of U.S. patent application Ser. No. 11/114,552, filed on Apr. 26, 2005 and claims priority thereto under 35 U.S.C. §120, the disclosure of which is incorporated herein by reference.

BACKGROUND OF THE INVENTION

1. Technical Field

The present invention relates generally to an improved data processing system and in particular to a method and apparatus for decrypting processor instructions. Still more particularly, the present invention provides fast decryption of processor instructions in an encrypted instruction Power™ architecture.

2. Description of Related Art

Encryption of program instructions can provide data security while programs are stored outside of system memory, and also within, where program code may be subject to attacks. However, decryption of encrypted program code is typically time and resource consuming.

Therefore, it would be desirable to provide a method for fast decryption of processor instructions.

SUMMARY OF THE INVENTION

The present invention provides a method and apparatus that decode a stream of program instructions using a programmable look-up coding programmed by a process at a higher privilege level. Op-codes within the instruction stream are individually encrypted. A field within the encrypted op-codes is extracted and decoded using the programmable look-up coding, the result of which is then re-combined with the remainder of the op-code exclusive of the field. The instructions may be encrypted using the same programmable look-up.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
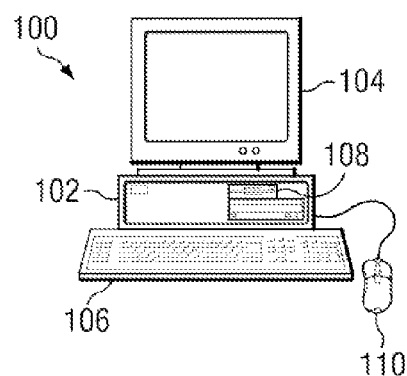
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
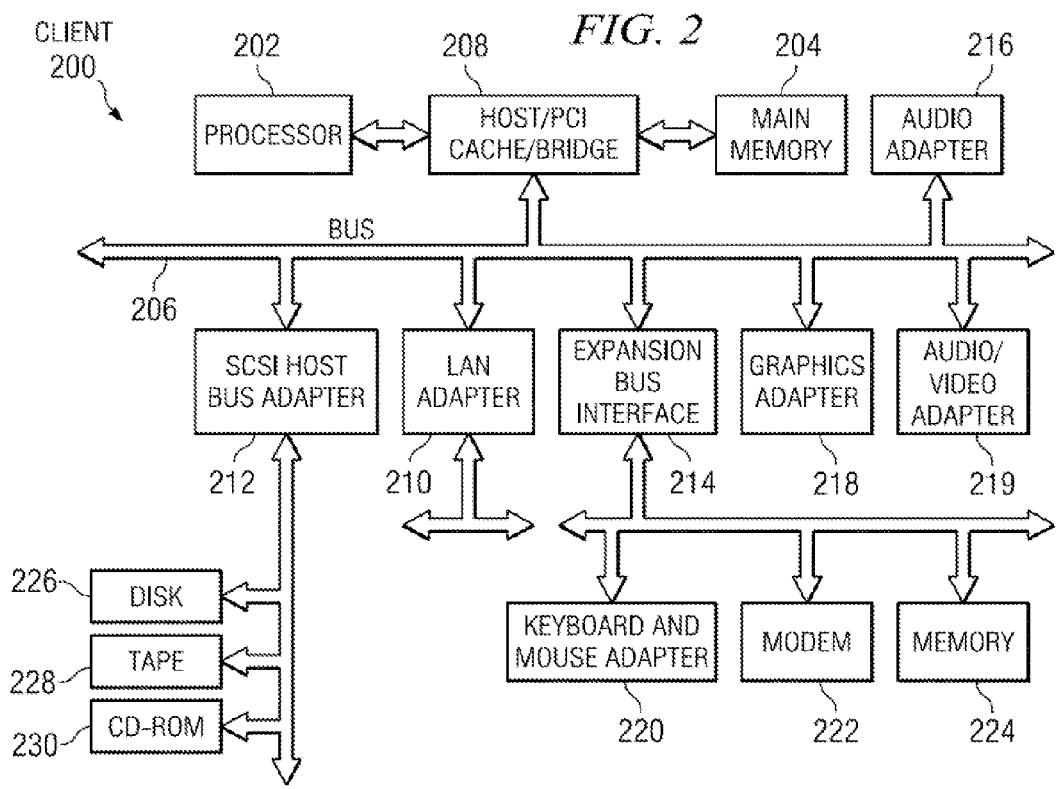
FIG. 2 is a block diagram of a data processing system that may be implemented as a server in accordance with a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
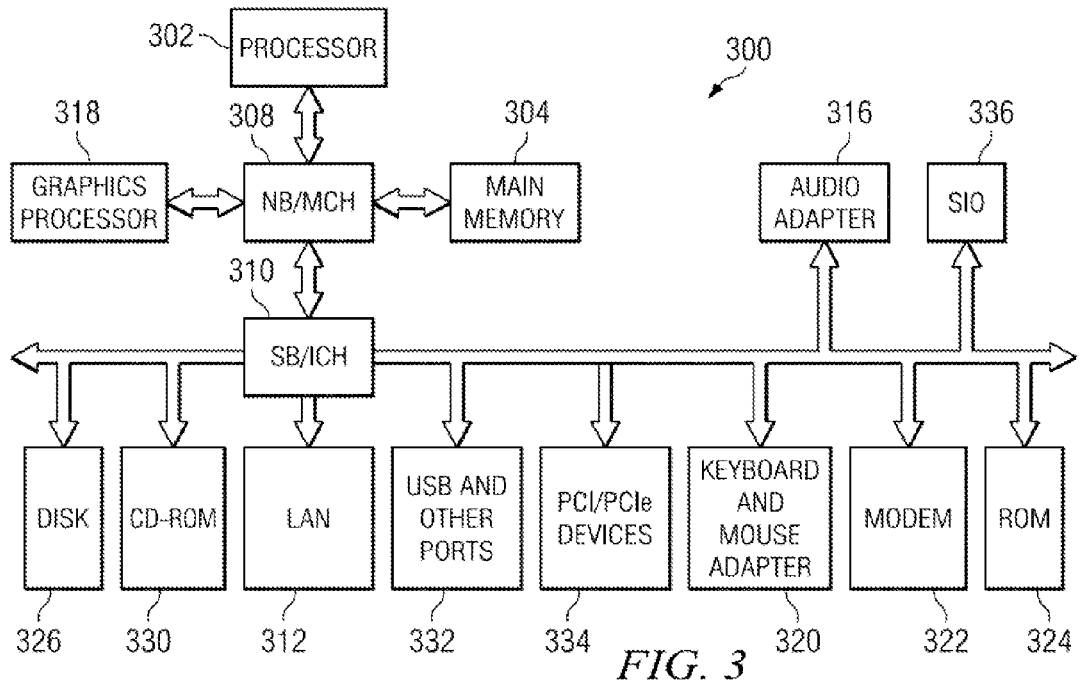
FIG. 3 is a block diagram of a data processing system in which the present invention may be implemented.

With reference now to FIG. 3, a block diagram of a data processing system is shown in which the present invention may be implemented. Data processing system 300 is an example of a computer, such as computer 100 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention recognizes that the ability of a virus or worm to launch an attack is dependent on the operating system and instruction architecture. By changing either of these components, the attack methodology is compromised. Because the predominant dependency of these attacks is on the processor instruction architecture, data processing systems using non-Intel architectures are not directly susceptible to attacks launched against an Intel architecture. As preferably embodied, this present invention provides a programmable decryption unit in the instruction pipeline between the L2 and L1 instruction cache. This programmable decryption unit accomplishes the instruction decryption as architected instructions enter the L1 instruction cache.

Figure 4:
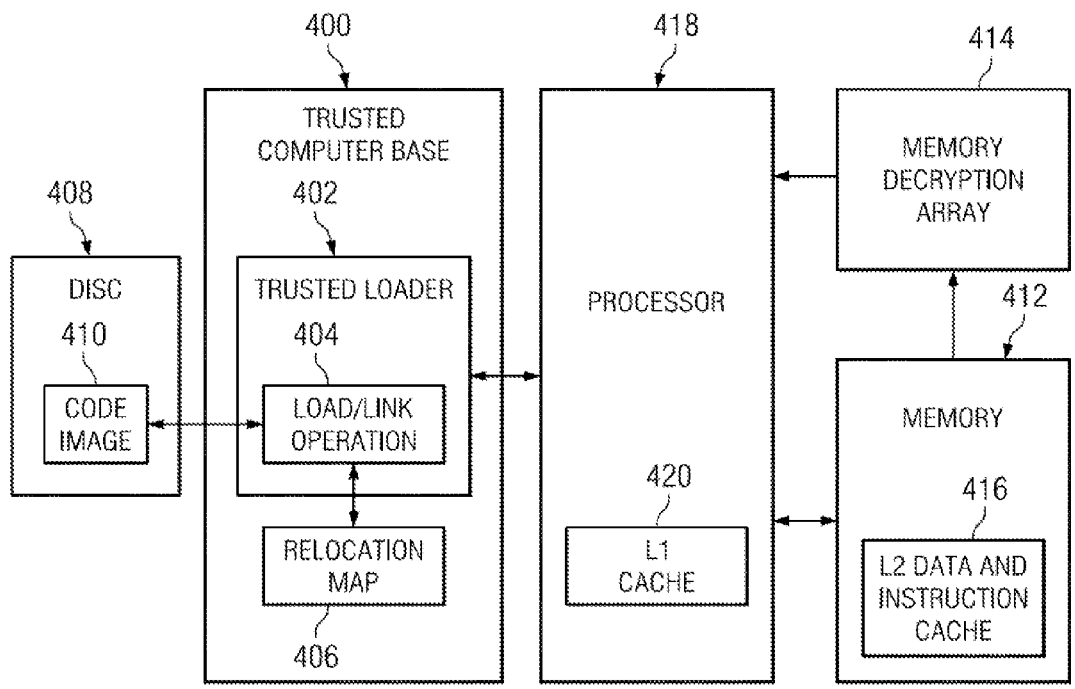
FIG. 4 is a diagram illustrating components used in the programmable decryption unit in the instruction pipeline.

With reference now to FIG. 4, a diagram illustrating components used in the programmable decryption unit in the instruction pipeline is depicted in accordance with a preferred embodiment of the present invention. As illustrated, trusted computer base 400 includes trusted loader 402, which performs load/link operations 404 on a code image 410 which is usually located on disc 408. A Trusted Computer Base (TCB) is that part of a computer system that is trusted. This part of the computer has been verified to have no malicious code or components that would impact the security of a system. Trusted computer base 400 is a portion of the data processing system that is trusted to be free of malicious code, such as, viruses or worms.

When instructions are selected for decryption, the instructions are located via relocation map 406 in trusted computer base 400. In this exemplary embodiment, the instructions are fetched from L2 data and instruction cache 416 in memory 412 and decrypted using memory decryption array 414. Memory decryption array 414 decrypts the instructions using a method that will be described in FIGS. 6 and 7. Then, the encrypted instructions are received by an instruction execution unit, such as by processor 418 or by L1 cache 420, although any instruction execution unit may receive the decrypted instruction. Any instruction stream not loaded by trusted loader 402 cannot receive the correct encoding and upon decryption will cause an illegal instruction interrupt. This protects trusted computer base 400 from any code that is loaded and executed which falls outside the security model, i.e. code loaded through exploitation of system vulnerability. Additionally this invention prevents privilege escalation, which is code that exploits a vulnerability to change privilege level.

Figure 5:
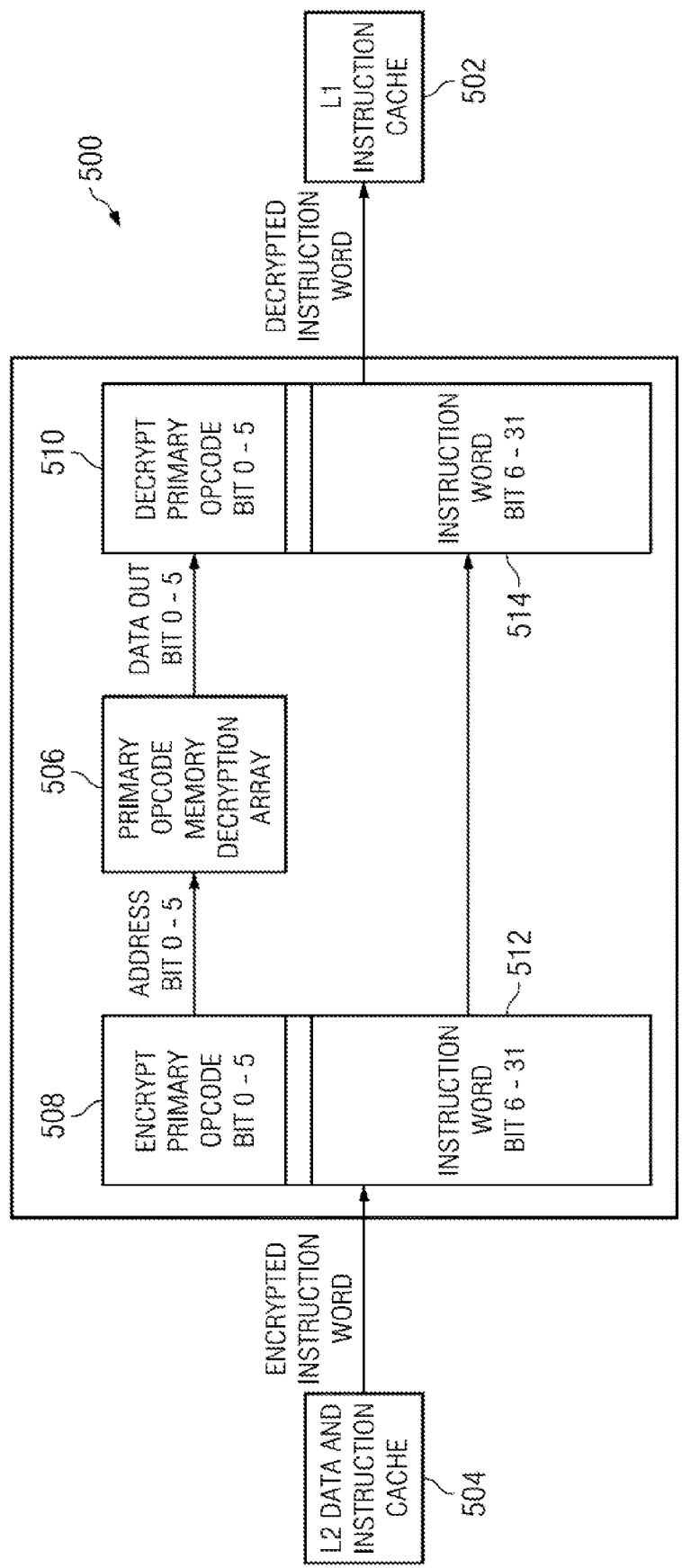
FIG. 5 is a diagram illustrating a simplified programmable decryption unit for primary opcodes is depicted in accordance with a preferred embodiment of the present invention.

With reference now to FIG. 5, a diagram illustrating a simplified programmable decryption unit 500 for primary opcodes is depicted in accordance with a preferred embodiment of the present invention. Primary memory array 506 is programmed to decrypt the instructions fetched from L2 Data and Instruction cache 504 into L1 instruction cache 502. As instructions are fetched from L2 data and instruction cache 504 into L1 instruction cache 502 the opcode bits 0-5 for the primary opcode 508 are used as the address bits 0-5 for primary memory array 506. Primary memory array 506 is configured to receive address bits 0-5, decrypt the bits and provide output data bits 0-5 to decrypted primary opcode 510. Instruction bits 6-31 512 are passed directly to instruction bits 6-31 514.

Primary memory array 506 may be part of a larger memory array. As part of a larger memory array, primary memory array 506 may operate in a hypervisor mode, a supervisor mode, or a user mode. These modes or levels allow privilege level decryption that prevents privilege escalation through exploitation of the operating system or hypervisor vulnerability. Additionally, a default mode, not shown, allows instructions to pass without decryption. Primary memory array 506 is programmed at different times and each privilege mode or level is programmable by the level(s) above. Hypervisor mode is programmed via the Serial COMmunications (SCOM) port by the Flexible i&p Series (FipS) code prior to hypervisor execution, the supervisor mode is programmed prior to the operating system executing on the processor, and the user mode is programmed from supervisor mode prior to user mode execution. Primary memory array 506 may operate in any mode. Because the instructions are decrypted prior to entering L1 instruction cache 502, the operational advantage of the instruction cache is preserved.

Figure 6:
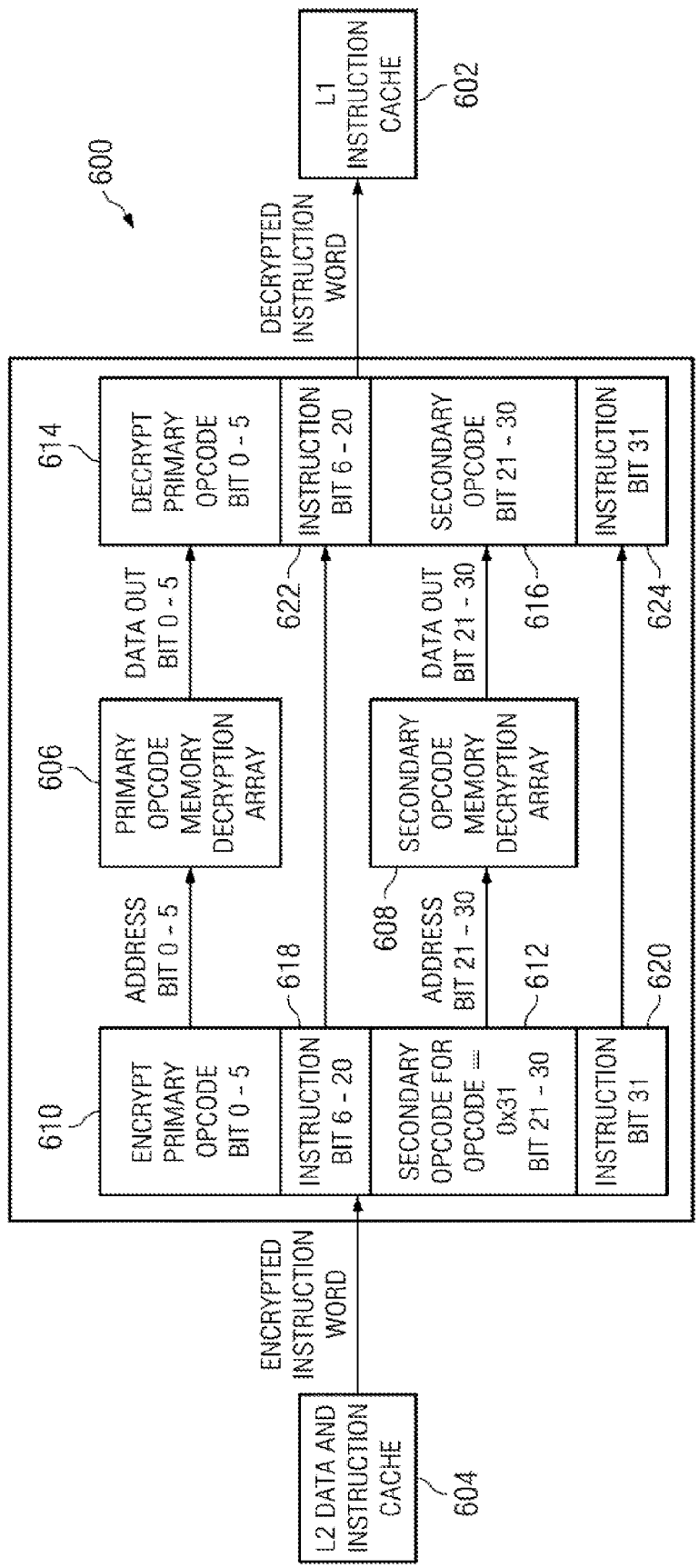
FIG. 6 is a diagram illustrating a primary and a secondary opcode decryption unit in accordance with a preferred embodiment of the present invention.

With reference now to FIG. 6, a diagram illustrating a primary and a secondary opcode decryption unit is depicted in accordance with a preferred embodiment of the present invention. For example, in an architecture with dense primary opcode space such as the Power™ architecture, it is necessary to use secondary opcode mapping to increase the Strength of Function (SOF) necessary to thwart more sophisticated attacks.

Primary memory array 606 and secondary memory array 608 in opcode decryption unit 600 are programmed to decrypt instructions fetched from L2 Data and Instruction cache 604 into L1 instruction cache 602. As instructions are fetched from L2 data and instruction cache 604 opcode bits 0-5 for the primary opcode 610 and opcode bits 21-30 for secondary opcode 612 are used as address bits for primary memory array 606 and secondary memory array 608. Primary memory array 606 is configured to receive address bits 0-5, decrypt the bits and provide output data bits 0-5 to decrypted primary opcode 614. Secondary memory array 608 is configured to receive address bits 21-30, decrypt the bits and provide output data bits 21-30 to decrypted secondary opcode 616. In this example, the secondary opcode 612 is only used when the primary opcode 610 equals 0x31, which is the hexadecimal representation of the opcode. The secondary opcode 612 may also be used when the secondary opcode 612 space is very sparse, less than 50 percent, and when the instructions provides a large number of permutations. Instruction bits 618 and 620 are not decrypted and are passed directly from encryption bits 618 and 620 to decryption bits 622 and 624.

FIG. 6 depicts memory arrays that have address lines, primary opcode 610 and secondary opcode 612, driven by the data presented by the L2 data and instruction cache 604, when the data is latched on these address lines, the data bus presents decrypt instructions. The presentation of these decrypt instructions is depicted as primary opcode 610 bit 0-5 being driven to primary memory array 606 and secondary opcode 612 bit 21-30 being driven into the secondary memory array 608.

In these illustrative examples, primary memory array 606 and secondary memory array 608 are arranged as three sections, hypervisor mode, supervisor mode, and user mode. This allows privilege level decryption that prevents privilege escalation through exploitation of operating system or hypervisor vulnerability. Additionally a default mode, not shown, is allowed that passes the instructions without decryption. Primary memory array 606 and secondary memory array 608 are programmed at different times and each privilege level is programmable by the level(s) above. Hypervisor mode is programmed via the SCOM port by the FipS code prior to hypervisor execution, the supervisor mode is programmed prior to the operating system executing on the processor, and the user mode is programmed from supervisor mode prior to user mode execution. Both primary memory array 606 and secondary memory array 608 may operate in any mode or in any combination of modes. Because the instructions are decrypted prior to entering L1 instruction cache 602, the operational advantage of the instruction cache is preserved.

Thus, the present invention provides a method and apparatus for an independent operating system for the prevention of certain classes of computer attacks that have previously not been preventable. An effective methodology is provided to implement instruction decryption using the existing instruction set for a processor. Significant hurdles are addressed in the processor architecture so as to limit the impact to processor execution timing. Instruction execution timing is not altered in the processor core. Any additional processing is overlapped into existing operations and, therefore, the impact on processor throughput is minimal.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for decrypting program code, the method comprising:
    fetching an encrypted instruction stream of an executable program, wherein the encrypted instruction stream includes individually encrypted opcodes;
    decoding a field within each of the individual opcodes in conformity with a look-up coding to provide decrypted values corresponding to the individual opcodes;

combining the decrypted values with a remaining portion of the corresponding individual opcodes exclusive of the field, to form a stream of decrypted instructions; and providing the decrypted instructions to a processor within the computer system for execution of the decrypted instructions.

2. The method of claim 1, wherein the look-up coding is programmable, so that a program other than the executable program can manage an encryption applied to the encrypted instruction stream and a decrypting performed by the decoding and combining.

3. The method of claim 2, wherein the look-up coding is programmable only by a process executing at a higher privilege level than another privilege level of the executable program.

4. The method of claim 1, wherein the decoding comprises providing the field within the individual opcodes as addresses to a memory array having values programmed as a look-up table for performing the decoding, whereby a data output of the memory array provides the decrypted values.

5. The method of claim 4, wherein the memory array is a portion of system memory within the computer system.

6. The method of claim 4, wherein the decoding comprises first decoding, wherein the field is a first field, wherein the decrypted values are first decrypted values, and wherein the method further comprises second decoding another field within the individual opcodes in conformity with a second variable decryption coding set to produce second decrypted values, and wherein the combining combines the first and the second decrypted values with another remaining portion of the instructions exclusive of the first and second fields, to form the stream of decrypted instructions.

7. The method of claim 6, further comprising determining whether the first field has a predetermined value, and wherein the second decoding is performed only if the first field has the predetermined value.

8. A processor, comprising:
at least one cache memory for storing program instructions;
a decoding circuit for receiving and decoding encrypted instructions corresponding to an executable program and comprising individually encrypted opcodes by decoding a field within each of the individual opcodes in conformity with a look-up coding to provide decrypted values corresponding to the individual opcodes, combining the decrypted values with a remaining portion of the corresponding individual opcodes exclusive of the field, to form a stream of decrypted instructions, and storing the decrypted instructions in the at least one cache memory; and
an instruction pipeline for executing program instructions received from the at least one cache memory.

9. The processor of claim 8, wherein the look-up coding is programmable, so that a program other than the executable program can manage an encryption applied to the encrypted instruction stream and a decrypting performed by the decoding circuit.

10. The processor of claim 9, wherein the look-up coding is programmable only by a process executing at a higher privilege level than another privilege level of the executable program.

11. The processor of claim 8, wherein the decoding circuit provides the field within the individual opcodes as addresses to a memory array having values programmed as a look-up table for performing the decoding, whereby a data output of the memory array provides the decrypted values.

12. The processor of claim 11, wherein the memory array is a portion of system memory accessible by the processor.

13. The processor of claim 11, wherein the decrypted values are first decrypted values, wherein the decoding circuit further decodes another field within the individual opcodes in conformity with a second variable decryption coding set to produce second decrypted values, and wherein the decoding circuit combines the first and the second decrypted values with another remaining portion of the instructions exclusive of the first and second fields, to form the stream of decrypted instructions.

14. The processor of claim 13, further wherein the decoding circuit determines whether the first field has a predetermined value, and decodes the another field only if the first field has the predetermined value.

15. A computer system comprising:
a memory for storing program instructions corresponding to an executable program and comprising individually encrypted opcodes; and
a processor for executing the program instructions stored in the memory, wherein the processor comprises at least one cache memory for storing program instructions, a decoding circuit for receiving and decoding encrypted instructions corresponding to an executable program by decoding a field within each of the individual opcodes in conformity with a look-up coding to provide decrypted values corresponding to the individual opcodes, combining the decrypted values with a remaining portion of the corresponding individual opcodes exclusive of the field, to form a stream of decrypted instructions, and storing the decrypted instructions in the at least one cache memory, and an instruction pipeline for executing program instructions received from the at least one cache memory.

16. The computer system of claim 15, wherein the look-up coding is programmable, so that a program other than the executable program can manage an encryption applied to the encrypted instruction stream and a decrypting performed by the decoding circuit.

17. The computer system of claim 16, wherein the look-up coding is programmable only by a process executing at a higher privilege level than another privilege level of the executable program.

18. The computer system of claim 15, wherein the decoding circuit provides the field within the individual opcodes as addresses to a memory array having values programmed as a look-up table for performing the decoding, whereby a data output of the memory array provides the decrypted values.

19. The computer system of claim 15, wherein the memory array is a portion of system memory accessible by the processor.

20. The computer system of claim 18, wherein the decrypted values are first decrypted values, wherein the decoding circuit further decodes another field within the individual opcodes in conformity with a second variable decryption coding set to produce second decrypted values, and wherein the decoding circuit combines the first and the second decrypted values with another remaining portion of the instructions exclusive of the first and second fields, to form the stream of decrypted instructions.

21. The computer system of claim 20, further wherein the decoding circuit determines whether the first field has a predetermined value, and decodes the another field only if the first field has the predetermined value.

* * * * *